United States Patent
Takabayashi

(10) Patent No.: US 8,096,336 B2
(45) Date of Patent: Jan. 17, 2012

(54) METHOD OF MANUFACTURING LIQUID CRYSTAL DISPLAY APPARATUS AND MANUFACTURING DEVICE THEREFOR

(75) Inventor: Hironori Takabayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 11/858,657

(22) Filed: Sep. 20, 2007

(65) Prior Publication Data
US 2008/0011418 A1    Jan. 17, 2008

Related U.S. Application Data

(62) Division of application No. 10/234,162, filed on Sep. 5, 2002, now Pat. No. 7,385,667.

(30) Foreign Application Priority Data

Sep. 5, 2001 (JP) .................. 2001-269292

(51) Int. Cl.
*G05G 15/00* (2006.01)
(52) U.S. Cl. .......... 156/362; 156/64; 156/350; 156/363; 156/364; 156/378; 156/381; 445/24; 445/25; 445/60
(58) Field of Classification Search .......... 156/64, 156/350, 362, 363, 364, 378, 381; 445/24, 445/25, 60
See application file for complete search history.

(56) References Cited

U.S. PATENT DOCUMENTS

| | | |
|---|---|---|
| 5,078,477 A | 1/1992 | Jono et al. |
| 5,898,041 A | 4/1999 | Yamada et al. |
| 6,036,568 A | 3/2000 | Murouchi et al. |
| 6,104,466 A | 8/2000 | Buchwalter et al. |
| 6,193,576 B1 | 2/2001 | Gaynes et al. |
| 6,388,339 B1 | 5/2002 | Yamamoto et al. |
| 6,847,429 B2 | 1/2005 | Cho |

FOREIGN PATENT DOCUMENTS
JP    2001-264780    9/2001

OTHER PUBLICATIONS

Merriam Webster's Collegiate Dictionary 10th Ed. p. 1320 (Copyright 1999).

*Primary Examiner* — Katarzyna Wyrozebski Lee
*Assistant Examiner* — Joshel Rivera
(74) *Attorney, Agent, or Firm* — Oblon, Spivak, McClelland, Maier & Neustadt, L.L.P.

(57) ABSTRACT

The apparatus for manufacturing a liquid crystal display apparatus is equipped with the XYZθ-movement mechanism can move at least one of the first and second attraction stages in a vertical direction so as to adhere the first and second substrates to each other via the sealing agent, and then move the first and second attraction stages relatively to each other in a horizontal direction on the basis of an ordered movement amount, so as to align the first and second substrates with each other, and a control device that can move the first and second substrates relatively to each other by a predetermined amount more than the ordered movement amount while aligning the first and second substrates with each other by the XYZθ-movement mechanism, so as to set the first and second substrates at target positions.

3 Claims, 3 Drawing Sheets

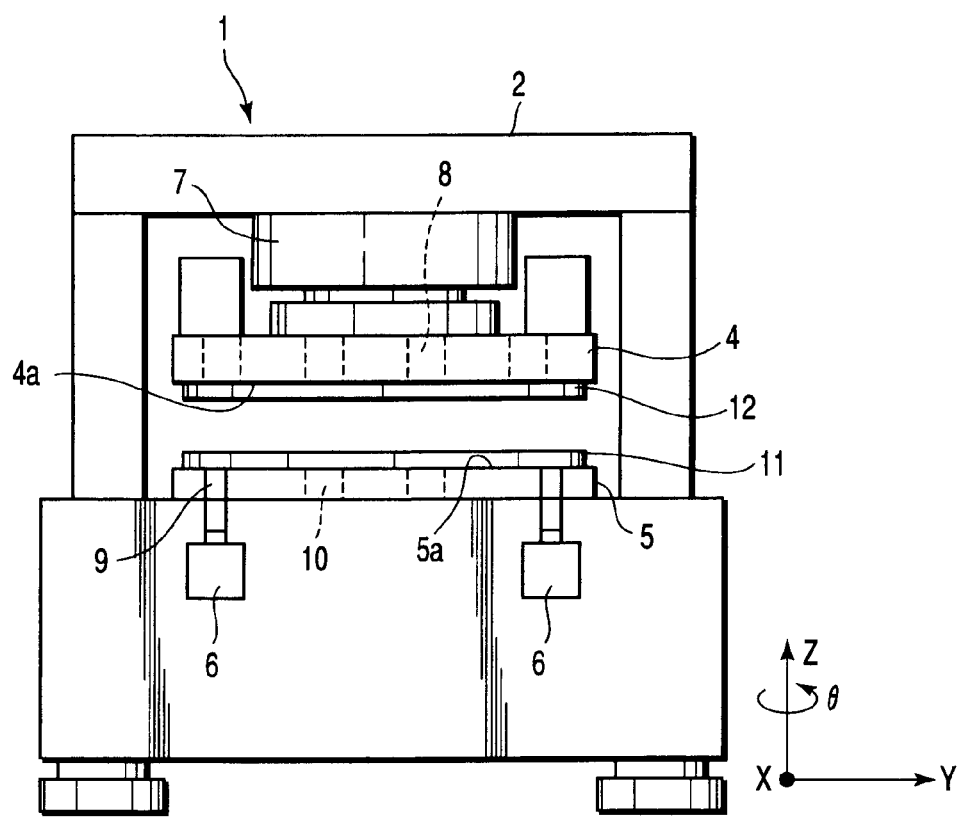
F I G. 1
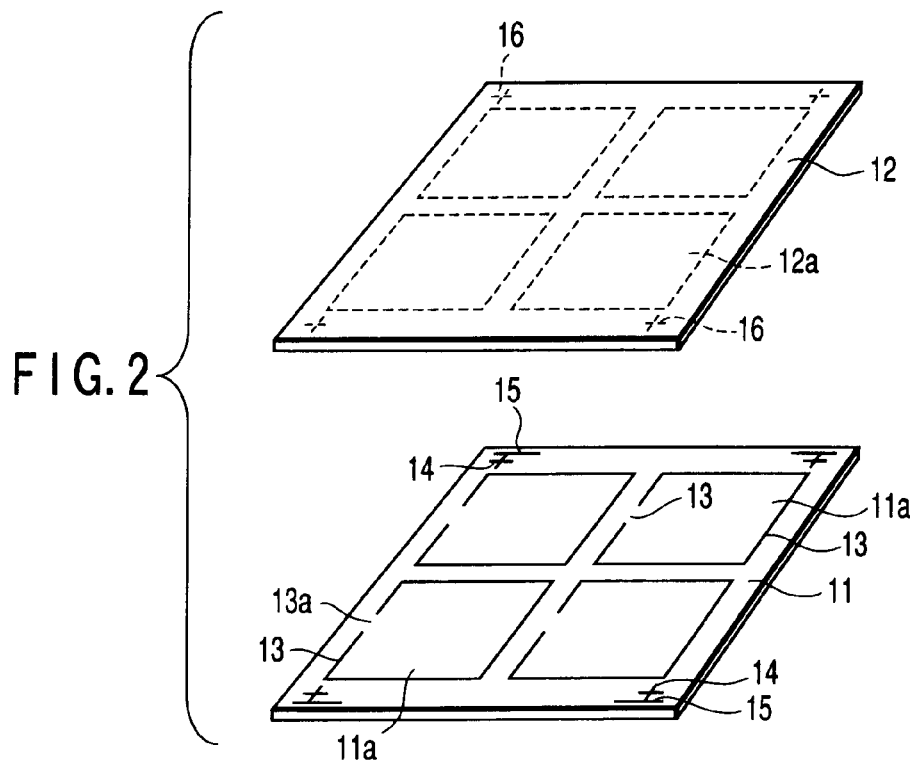
F I G. 2

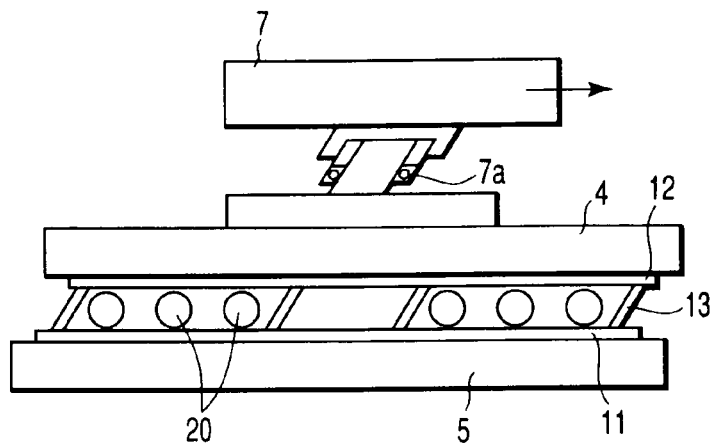
F I G. 3
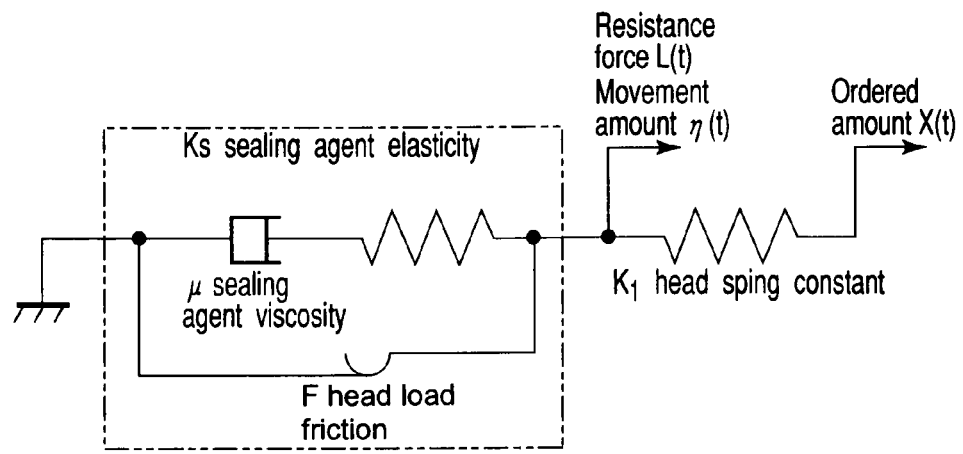
F I G. 4
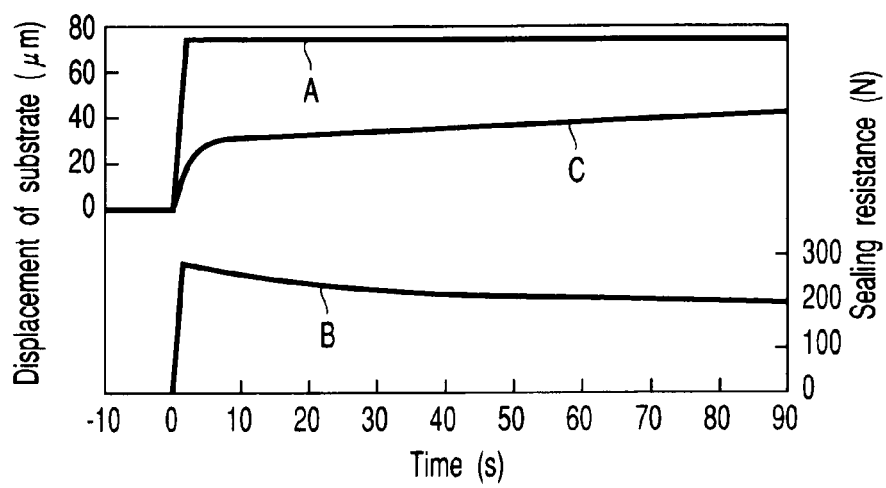
F I G. 5

METHOD OF MANUFACTURING LIQUID CRYSTAL DISPLAY APPARATUS AND MANUFACTURING DEVICE THEREFOR

CROSS-REFERENCE TO RELATED APPLICATIONS

This application is a divisional of application Ser. No. 10/234,162 filed Sep. 5, 2002 and is based upon and claims the benefit of priority from the prior Japanese Patent Application No. 2001-269292, filed Sep. 5, 2001, the entire contents of which are incorporated herein by reference.

BACKGROUND OF THE INVENTION

1. Field of the Invention

The present invention relates to a method of manufacturing a liquid crystal display apparatus used in a color television set or various types of office automation (OA) apparatus, and a manufacturing device for practicing such a method.

2. Description of the Related Art

Liquid crystal display apparatus used in a color television set or an OA apparatus have a structure in which the first polarizing plate made of a glass plate-like material, a color filter plate (the first substrate), a liquid crystal drive plate (the second substrate), the second polarizing plate and a flat-plate backlight are combined and laid one on another in this order from the display surface side.

A liquid crystal cell is manufactured by bonding the above-mentioned color filter plate and liquid crystal driving plate one on another while interposing liquid crystal and spacer between them. When the color filter plate and liquid crystal driving plate are bonded together, a thermosetting sealing agent is applied between the circumferential portions of these plates, and they are bonded with use of a bonding device.

Here, when bonding them together, it is required that the positions of the color filter plate and liquid crystal driving plate with relative to each other should be aligned at a high accuracy.

In the meantime, to meet the demand of increasing the size of the liquid crystal display screen and improving the production efficiency, such a procedure is employed that a plurality of liquid crystal cells (for example, 4 crystal cells of a size of 12 inches) are cut out of a large-scale glass substrate (400 nm×500 nm).

The bonding device has a stand and an XYZθ driving mechanism is provided on the stand. The XYZθ driving mechanism includes a first attraction stage configured to attract an opposing substrate to the stage and hole it in a horizontal state. The opposing substrate contains a plurality of sheets of effective regions that constitute the above-mentioned color filter plate.

On the other hand, a second attraction stage is provided underneath the first attraction stage, and an array substrate is attracted to the second attraction stage and held on it in a horizontal state. The array substrate contains a plurality of sheets of effective regions that constitute the above-mentioned liquid crystal driving plate, and this substrate is set to face the opposing substrate.

Underneath the second attraction stage, there are provided recognition cameras for recognizing alignment marks provided on, for example, four corners of the opposing substrate and the array substrate, and an ultraviolet ray irradiating means for hardening a UV-hardening sealing agent used for preliminary fixation, which will be explained later.

Now, the step of bonding the opposing substrate and the array substrate together will now be described.

First, the thermosetting sealing agent for sealing liquid crystal is applied onto the array substrate in an amount for four liquid crystal cells, and the UV-hardening sealing agent for preliminary fixation is applied onto a vicinity of the alignment mark at each of the four corners of the substrate. Then, the array substrate is attracted and fixed on the first attraction stage. After that, the opposing substrate is attracted to the second attraction stage and held on it to be in parallel to the array substrate. After that, the opposing substrate is moved down so as to bring it into contact with the thermosetting sealing agent and the UV-hardening sealing agent for preliminary fixation, that are provided on the array substrate. Subsequently, the position alignment marks made at the circumferential portions of the opposing substrate and array substrate are aligned with each other while monitoring them with the recognition cameras. At the same time, the opposing substrate is moved down such that the gap between the opposing substrate and array substrate becomes a predetermined distance.

Next, an ultraviolet ray is irradiated onto the preliminary-fixation UV-hardening sealing agent applied on the vicinities of the alignment marks, and thus the opposing substrate and array substrate are preliminary fixed together. The opposing substrate and array substrate that are preliminary fixed together as above are heated in the subsequent step. Thus, the thermosetting sealing agent is hardened and they are adhered together permanently.

However, in the conventional techniques, the opposing substrate and array substrate are aligned with each other while they are brought into contact with each other via the thermosetting sealing agent and UV-hardening sealing agent. In this state, the viscoelastic resistance of each sealing agent is applied to the XYZθ driving mechanism and the second attraction stage, resulting in that some distortion is created in the entire bonding device.

Here, the distortion is proportional to the amount of movement of the opposing substrate, and therefore even if correction is performed on the basis of a correction amount calculated after detection of the displacement amount with use of the recognition cameras, some distortion is still inevitable. For this reason, it is not possible to carry the opposing substrate to the desired position by one movement, but the correction must be repeated many times until the displacement error falls within a generally-accepted allowable range of ±1 μm.

Such operations cause an increase in tact time in the sell assembly step or eventually a decrease in the production efficiency.

BRIEF SUMMARY OF THE INVENTION

The present invention has been achieved in consideration of the above-described drawbacks of the conventional art and the object thereof is to provide a method of manufacturing a liquid crystal display apparatus, that can accurately align the first and second substrates with each other in one correction of position without having to repeatedly carry out the correction of the position of substrates, and a manufacturing device that practices such a method.

According to an aspect of the present invention, there is provided a method of manufacturing a liquid crystal display apparatus, comprising: adhering a first substrate and a second substrate with each other via a sealing agent made of a viscoelastic material; and while aligning the first and second substrates adhered with each other by moving them relatively with each other on the basis of a relative displacement amount between the first and second substrates, first moving the first and second substrates relatively to each other by a predetermined amount more than the relative displacement amount and then moving them back to target positions.

According to another aspect of the present invention, there is provided a method of manufacturing a liquid crystal display apparatus, comprising: adhering a first substrate and a second substrate with each other via a sealing agent made of a viscoelastic material; and while aligning the first and second substrates adhered with each other at target positions by moving them relatively with each other, first moving the first and second substrates relatively to each other further than the target positions in a first direction, and then moving them relatively to each other in a second direction that is opposite to the first direction.

According to still another aspect of the present invention, there is provided an apparatus for manufacturing a liquid crystal display apparatus, comprising: a first holding device configured to hold a first substrate coated with a sealing agent made of a viscoelastic material such as to surround a display region thereof; a second holding device configured to hold a second substrate on which an effective region is formed at a position corresponding to the display region of the first substrate, such that the second substrate opposes the first holding device; a movement device configured to move at least one of the first and second holding devices in a vertical direction so as to adhere the first and second substrates to each other via the sealing agent, and then to move the first and second holding devices relatively to each other in a horizontal direction on the basis of an ordered movement amount, so as to align the first and second substrates with each other; and a control device configured to move the first and second substrates relatively to each other by a predetermined amount more than the ordered movement amount while aligning the first and second substrates with each other by the movement device, so as to set the first and second substrates at target positions.

According to still another aspect of the present invention, there is provided an apparatus for manufacturing a liquid crystal display apparatus, comprising: a first holding device configured to hold a first substrate coated with a sealing agent made of a viscoelastic material such as to surround a display region thereof; a second holding device configured to hold a second substrate on which an effective region is formed at a position corresponding to the display region of the first substrate, such that the second substrate opposes the first holding device; a movement device configured to move at least one of the first and second holding devices in a vertical direction so as to adhere the first and second substrates to each other via the sealing agent, and then to move the first and second holding devices relatively to each other in a horizontal direction on the basis of an ordered movement amount, so as to align the first and second substrates with each other; and a control device configured to move the first and second substrates relatively to each other further than the target positions in a first direction, and then move them relatively to each other in a second direction that is opposite to the first direction so as to return them to the target positions while aligning the first and second substrates adhered with each other by the movement device.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram illustrating the structure of a device for manufacturing a liquid crystal display apparatus, according to an embodiment of the present invention;

FIG. 2 is a schematic diagram showing the first and second glass substrates;

FIG. 3 is a perspective view showing the structure of the XYZθ-driving mechanism;

FIG. 4 is a modeling diagram illustrating an alignment of a pair of substrates that are bonded together by means of a sealing agent;

FIG. 5 is a graph illustrating the relationship between the displacement of the substrate with respect to the order amount, and the resistance of the sealing agent;

DETAILED DESCRIPTION OF THE INVENTION

Figure 6:
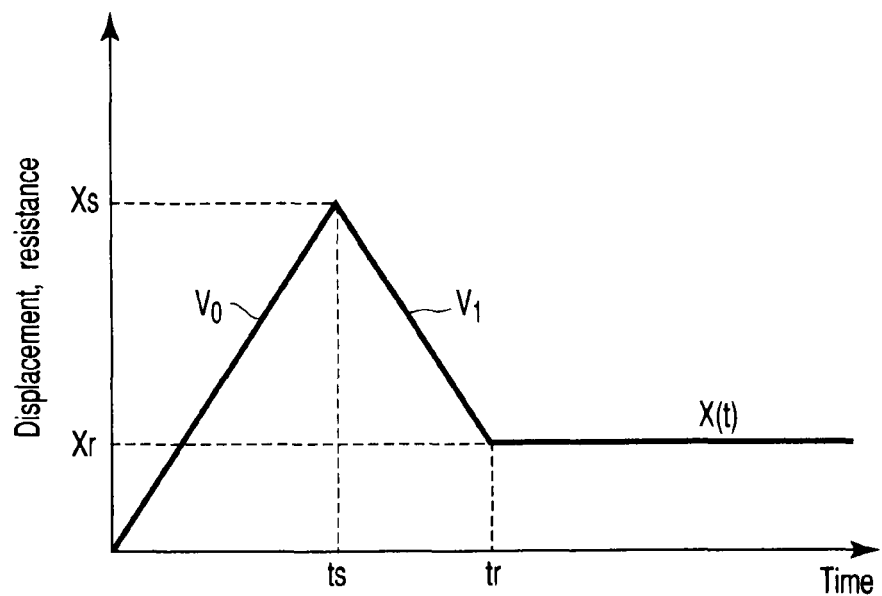
FIG. 6 is a graph indicating the movement order amount given to the second substrate.

The present invention will now be described in detail with reference to an embodiment illustrated in the drawings.

FIG. 1 illustrates a device 1 for manufacturing a liquid crystal display apparatus, according to an embodiment of the present invention. The manufacturing device 1 includes a bonding device 2 used for bonding two glass substrates for a liquid crystal cell, together, that will be explained later, and a substrate feeding portion (not shown) for feeding the glass substrate to the bonding device 2.

The bonding device 2 includes the first and second attraction stages 5 and 4, respectively, to serve as the first and second holding devices, which are arranged in an up-and-down direction to face each other. The first and second attraction stages 5 and 4 are formed to have a rectangular shape, and the plane of the surface for holding a substrate is set to be substantially horizontal. The second attraction stage 4 is made of a light transmitting material such as quartz glass.

The second attraction stage 4 is mounted on an XYZθ-movement mechanism 7 that serves as a movement device. The XYZθ-movement mechanism 7 is movable in the X-axis direction as well as in the Y-axis direction in a horizontal plane, and further it is ascendable/descendable in a vertical axial direction (that is, the Z-axis direction) with respect to the horizontal plane. Furthermore, the XYZθ-movement mechanism 7 is rotatable around the vertical axis within the horizontal plane.

The second attraction stage 4 is moved by the operation of each of the X, Y, Z and θ axes of the XYZθ-movement mechanism 7 and thus the relative position of the second stage to the first attraction stage 5 is adjusted. Also, the second attraction stage 4 is moved by the operation of the Z-axis in a direction towards or away from the first attraction stage 5.

A second substrate holding surface 4a is formed on a lower surface (in the figure, it is shown from upward direction) of the second attraction stage 4. A great number of second attraction pores 8 are made in the second substrate holding surface 4a, and these second attraction pores 8 are connected to a vacuum pump via a second suction tube, which is not shown.

On the lower surface side of the first attraction stage 5, recognition cameras 6 each of which is a CCD camera are provided. Each of the recognition cameras 6 is designed to detect the error in the position of the substrate by recognizing the alignment marks made in the first substrate, which will be later described.

Each of the recognition cameras 6 is provided with ascending/descending means (not shown) for the purpose of focusing, with which the alignment marks can be recognized even if the array substrate (the first glass substrate), which will be explained later, and the opposing substrate (the second glass substrate) are located distant from each other.

Figure 7:
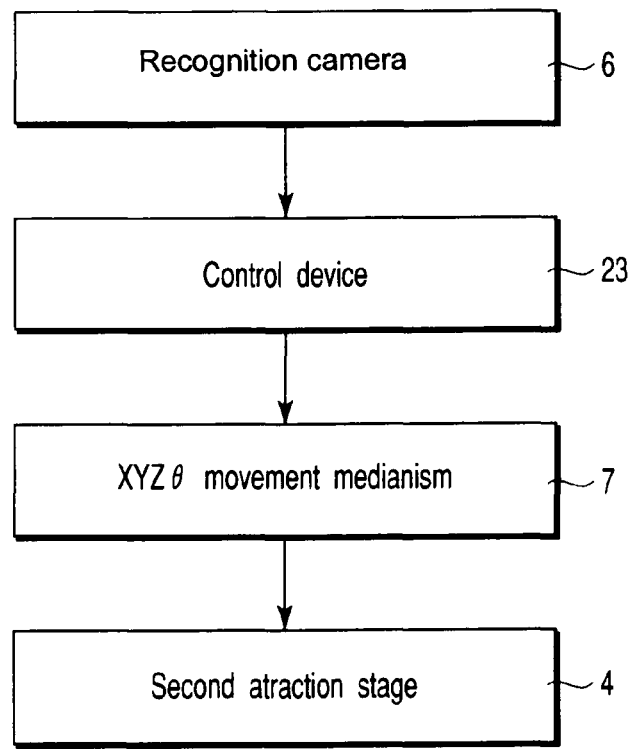
FIG. 7 is a block diagram illustrating the drive control mechanism of the second attraction stage.

Each of the recognition cameras 6 is, as shown in FIG. 7, connected to a control device 23 via a data transmission circuit. The control device 23 is connected also to the XYZθ-movement mechanism 7 via a control circuit.

On the other hand, a first substrate holding surface 5a is provided on an upper surface of the first attraction stage 5. A rectangular shaped opening portion 9 is made in the vicinities of the four corners of the first substrate holding surface 5a, and with these opening portions, the above-described recognition camera 6 is set on the stage. These opening portions are closed by the recognition camera 6 as it is set on. A great number of first attraction pores 10 are made in the first substrate holding surface 5a, and these first attraction pores 10 are connected to a vacuum pump via a first suction tube, which is not shown.

On the first and second attraction stages 5 and 4, the first and second glass substrates are fed respectively by means of a substrate feeding portion (not shown).

FIG. 2 illustrates a liquid crystal cell in an exploded view.

The liquid crystal cell is formed in the following manner. That is, an array substrate 11 and an opposing substrate 12 are adhered to a rectangular transparent substrate, and the resultant is cut into each and individual cell. Here, the array substrate 11 serves as the first substrate and is formed to be capable of making four LCD cell substrates by cutting the substrate itself, whereas the opposing substrate 12 serves as the second substrate formed to be capable of making four color filter substrates by cutting the substrate itself.

The array substrate 11 has a rectangular display region 11a prepared by forming a signal line, a scanning line, a pixel electrode and the like (all of them are not shown) on the surface of a glass substrate. Further, a thermosetting sealing agent 13 is applied on the array substrate 11 such as to surround the display region 11a. In some cases, an opening portion 13a serving as an inlet for supplying liquid crystal is made in a part of the applied sealing agent 13 after the array substrate 11 is adhered to the opposing substrate 12.

Spacers 20 (shown in FIG. 3) are applied by spraying on the display region 11a. The height of the sealing agent 13 is set to about 10 μm and the diameter of the spacers 20 is set to about 5 μm, and they serve to maintain the thickness of the region that is filled with liquid crystal to be uniform. It should be noted that spherical or columnar members are used as the spacers 20.

Further, an alignment mark 14 is made at, for example, the four corners of the array substrate 11, and is used to align the array substrate 11 with the opposing substrate 12, which will be later described. In a vicinity of each of the alignment mark 14, a UV-hardening sealing agent 15, that is used for preliminary fixation, is applied to have a thickness of about 50 μm.

The opposing substrate 12 is made of a glass substrate, and a lower surface of which has a rectangular effective region 12a, on which a counter electrode, a color filter and the like (none of which are not shown) are formed. The effective region 12a has dimensions corresponding to those of the display region 11a on the array substrate 11.

Further, at the four corners of the opposing substrate 12, alignment marks 16 that are counterparts respectively to the alignment marks 14 made for the array substrate 11.

Next, the manufacturing process of a liquid crystal cell, that is carried out with use of a manufacturing device 1 having the above-described structure, will now be described.

First, a pre-formed array substrate 11 is fed by a substrate supplying portion to the first attraction stage 5 of the bonding device 2 in such a manner that the surface on which the display region 11a is formed is arranged to oppose the second attraction stage 4. As the array substrate 11 is placed thereon in the above-described manner, the alignment marks 15 made on the array substrate 11 become to oppose the recognition camera 6, and the substrate is brought into contact with the first substrate holding surface 5a. From this state, a vacuum pump, which is not shown in the figure, is driven, and thus the array substrate 11 is attracted to and held on the first substrate holding surface 5a by means of the first attraction pores 10.

Subsequently, through similar steps to those for the array substrate 11, the opposing substrate 12 is supplied to the second attraction stage 4 such that it is attracted to and held on the second substrate holding surface 4a such that the surface on which the effective region 12a is formed is set to oppose the first attraction stage 5.

The opposing substrate 12 attracted and held as above, is aligned by the XYZθ-movement mechanism 7. The XYZθ-movement mechanism 7 is operated to move its X, Y, Z and θ-axes so that the alignment marks 16 formed on the opposing substrate 12 are set to face the alignment marks 14 of the array substrate 11 described above, as well as the recognition cameras 6. Thus, the array substrate 11 and the opposing substrate 12a are arranged such that the display region 11a and the effective regions 12a face with each other.

After while, the second attraction stage 4 is descended by the XYZθ-movement mechanism 7 so as to move the opposing substrate 12 in a direction towards the array substrate 11, and eventually the substrate 12 is brought into contact with the sealing agent 13 of the array substrate 11, as shown in FIG. 13.

After the contact, the alignment marks 14 provided on the array substrate 11 and the alignment marks 16 provided on the opposing substrate 12 are recognized once again with the recognition cameras 6. The recognized data is transmitted to the control device 23, where the displacement amount is obtained on the basis of the recognized data, and accordingly the correction amount is calculated. On the basis of the calculated correction amount, the XYZθ-movement mechanism 7 is driven to move the opposing substrate 12, thereby correcting the displacement.

Incidentally, when the substrates 11 and 12 are aligned with each other at a high accuracy by the XYZθ-movement mechanism 7, some resistance due to the viscoelasticity of the sealing agent 13 is applied to the XYZθ-movement mechanism 7. In this embodiment, the resistance is applied to a mount portion 7a of the XYZθ-movement mechanism 7. Due to the resistance force, the mount portion 15 is distorted, which results in a discrepancy between the movement amount instructed to the XYZθ-movement mechanism 7 and the actual movement amount of the opposing substrate 12.

The above-described situation can be expressed quantitatively by the following formula established for balance:

$$K1 \cdot (X(t) - \eta(t)) = L(t) \qquad \text{formula (1)}$$

where X represents the instructed movement amount for alignment, η represents the actual movement amount of the opposing substrate 12, L represents the resistance between the two substrates 11 and 12, and K1 represents the spring constant (stiffness) of the XYZθ-movement mechanism 7 including the mount portion 7a. Please note that t indicates time.

From the above-described formula (1), the actual movement amount η(t) of the opposing substrate 12 can be expressed by the following formula:

$$\eta(t)=X(t)-(L(t)/K1) \qquad \text{formula (2)}$$

When the shortage amount of the actual movement amount η(t) of the opposing substrate 12 with respect to the instructed movement amount X is indicated by Δ, the following relationship can be obtained:

$$\Delta=X(t)-\eta(t)=L(t)/K1 \qquad \text{formula (3)}$$

Therefore, the instructed amount X1 that can be obtained by adding in advance the shortage amount Δ to the instructed movement amount X(t) is expressed by the following formula:

$$X1(t)=\Delta+X(t)=L(t)/K1+X(t) \qquad \text{formula (4)}$$

Thus, if the instructed amount X1(t) is added, the shortage for the actual movement amount of the opposing substrate 12 with respect to the instructed amount will not result.

It should be noted that FIG. 4 is a model diagram showing the XYZθ-movement mechanism 7 of the present invention.

In this figure, the resistance L(t) between the substrates 11 and 12 is the resistance of the sealing agent 13, which is an eigenvalue determined by material conditions of the sealing agent 13 and substrates 11 and 12. This value can be obtained from the physical properties of the material or experiments, or it can be converted by actual calculation from the torque value of the driving motor of the XYZθ-movement mechanism 7.

By employing the above-described instruction method, the alignment operation, which must be conventionally repeated a number of times in order to compensate the shortage amount, can be done in one operation.

Next, another instruction method will now be described, and this method is carried out in consideration of a delayed deformation of the sealing agent 13, which is the main factor of the displacement resulting between the substrates 11 and 12.

As mentioned above, since the sealing agent 13 is made of a viscoelastic material and therefore a creep deformation (delayed deformation) is inevitably created. As indicated by a line A in FIG. 5, when a movement order for a certain period of time is given to the second attraction stage 4, the substrate 12 is being displaced with a shortage amount indicated by a line C in the figure depending on the relationship between the effect by the resistance resulting between the substrates 11 and 12 indicated by a line B and the spring constant (stiffness) of the XYZθ-movement mechanism 7 while being ordered to move. Then, even if the movement order is finished, the displacement of the substrate 12 further continues due to the effect of the internal stress stored in the viscous component of the sealing agent 13.

The above-described phenomenon can be formulated as follows, and in the following formulas, the first and second movement order completion times given to the XYZθ-movement mechanism 7 are represented by ts and tr, respectively, the first and second movement order speeds are represented by V0 and V1, respectively, the vertical load applied onto the substrate 12 by the XYZθ-movement mechanism 7 is represented by N, the viscosity of the sealing agent 13 is represented by μ, and the elasticity of the sealing agent 13 is represented by Ks.

Here, the movement amount η(t) of the substrate 12 while actually giving an order for the first alignment to the opposing substrate 12 (that is, when t≦ts), can be expressed by:

$$\eta(t)=X(t)-L(t)/K1 \qquad \text{formula (5)}$$

From this formula, the resistance L(t) of the substrate 12 can be expressed by:

$$L(t)=\mu V0(1-e-t/\lambda) \qquad \text{formula (6)}$$

Here, please note that λ=μ/K, 1/K=1/K+1/Ks.

Then, the movement amounts η(t) of the substrate 12 in the state where the order for the alignment is completed (that is, t>ts) can be expressed by:

$$\eta(t)=X(t)-L(t)/K1 \qquad \text{formula (7)}$$

From this formula, the resistance L(t) of the substrate 12 can be expressed by:

$$L(t)=\mu V0(1-e-ts/\lambda)e-(t-ts)/\lambda \qquad \text{formula (8)}$$

Here, in order to avoid the creep deformation, such a method that makes the resistance (t) that remains after the order is completed, zero. For example, for a target position, a movement amount that will go beyond this target position is instructed once by the first order, and then the second order of the movement amount is given to reverse the movement in an opposite direction, thus making the resistance zero. In this case, the resistance L(t) of the substrate 12 when t≦ts can be expressed by:

$$L(t)=\mu V0(1-e-t/\lambda) \qquad \text{formula (9)}$$

where the time for completing the first order in one direction is represented by ts, the time for completing the second order in an opposite direction is represented by tr, and the target movement amount is represented by Xr.

Further, the resistance L(t) of the substrate 12 when ts<t≦tr can be expressed by:

$$L(t)=(L(ts)-\mu V1)e-(t-ts)/\lambda+\mu V1 \qquad \text{formula (10)}$$

Furthermore, the resistance L(t) of the substrate 12 when t<tr can be expressed by:

$$L(t)=L(ts)e-(t-ts)/\lambda \qquad \text{formula (11)}$$

From the above formula, when Xs is resolved for the case L(tr)=0, that is, the resistance at a time tr is 0, the following formula can be obtained.

$$Xs=Xr/A \qquad \text{formula (12)}$$

From this formula, the following relationship can be induced:

$$A=1-\alpha \cdot e-\alpha ts/\lambda \cdot (1-e-\alpha ts/\lambda)/(1-\alpha \cdot e-\alpha ts/\lambda) \qquad \text{formula (13)}$$

Therefore, the following formula can be obtained.

$$tr=(\alpha+1)\cdot ts \qquad \text{formula (14)}$$

As indicated by the above-provided formulas, when the first and second movement order speeds V0 and V1 shown in FIG. 6 are given on the basis of the obtained Xs, the creep deformation of the sealing agent 13 can be avoided.

As described above, at least one of the substrate is moved horizontally to go beyond the target position, and then once again, it is moved in the direction towards the target position, thereby achieving the alignment without causing a creep deformation. After that, the array substrate 11 and the opposing substrate 12 are pressed against each other.

Here, it should be noted that in the case where they are aligned in consideration of a creep deformation that may occur during a preliminary hardening step, the substrate, in some cases, may not be moved actively towards the target position after the substrate has been moved to go beyond the target position.

After the completion of the alignment step, the preliminary fixation sealing agent 15 of the UV-hardening type, applied between the substrates 11 and 12 is irradiated with ultraviolet rays while keeping them compressed against each other. Thus, the preliminary fixation sealing agent 15 is hardened to preliminarily fix them together.

Subsequently, the attraction to the opposing substrate 12 and the attraction to the array substrate 11 are released, and further the first attraction stage 4 is ascended. Then, the array substrate 11 and the opposing substrate 12 adhered together are unloaded from the second attraction stage 5 by a transfer mechanism, which is not illustrated in the figure. Here, the step advances to the next one, where the sealing agent 13 is hardened for a permanent fixation of the substrates.

In the permanent fixation step for the sealing agent 13, the array substrate 11 and the opposing substrate 12 that are preliminarily fixed are kept in a compressed state, and further heat is applied thereto by a heater in order to harden the thermosetting sealing agent 13. Thus, the permanent fixation is conducted.

The array substrate 11 and the opposing substrate 12 that are permanently fixed are transferred to a scribe/break step, where the fixed resultant is divided into 4 sheets of empty liquid crystal cells. Then, the empty liquid crystal cells are transferred to a liquid crystal filling step, where liquid crystal is injected to each liquid crystal cell, and the injection inlet of each is sealed. After that, the first polarizing plate 2 is set on the color filter plate (opposing substrate) side, and the second polarizing plate and a backlight are arranged on the liquid crystal driving plate (array substrate side) in this order. The, they are fixed together, thus assembling a liquid crystal display apparatus.

It should be noted here that the first embodiment has a structure in which the array substrate (first glass substrate) is held on the first attraction stage 5 side, and the opposing substrate (second glass substrate) is held on the second attraction stage 4 side; however it is alternatively possible to have a structure in which the opposing substrate (second glass substrate) is held on the first attraction stage 5 side, and the array substrate (first glass substrate) is held on the second attraction stage 4 side.

As described above, for the alignment of the array substrate 11 and the opposing substrate 12 with each other, they are moved while making a compensation for the shortage of the movement amount, that results due to the resistance acting between the substrates 11 and 12, to reach the target position. In this manner, it is no longer necessary to repeat the alignment correction, and therefore the tact time can be shortened, thus making it possible to improve the productivity.

Further, the alignment of the substrates 11 and 12 employs such a method that is affected by a creep deformation caused by the viscoelastic resistance of the sealing agent 13. Therefore, the tact time in the alignment step can be further shortened, and accordingly the production cost can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for manufacturing a liquid crystal display apparatus, comprising:
    a first holding device configured to hold a first substrate coated with a sealing agent made of a viscoelastic material such as to surround a display region thereof;
    a second holding device configured to hold a second substrate on which an effective region is formed at a position corresponding to the display region of the first substrate, such that the second substrate opposes the first holding device;
    a movement device configured to move at least one of the first and second holding devices in a vertical direction so as to adhere the first and second substrates to each other via the sealing agent, and then to move the first and second holding devices relatively to each other in a horizontal direction so as to align the first and second substrates with each other;
    a control device configured to calculate an amount of position displacement in a horizontal direction occurring when the first and second substrates are adhered to each other by the movement device, and to move the first and second substrates with use of the movement device so as to correct the position displacement,
    wherein
    the control device calculates a shortage of a movement amount of each of the first and second substrates, which results due to a resistance acting between the first and second substrates,
    said control device includes and provides instructions to move the first and second substrates by an additional movement amount for the shortage calculated, and
    the shortage of the movement amount of each of the first and second substrates is obtained by L/K1, where the resistance between the first and second substrates is represented by L and a rigidity of the moving device is represented by K1.

2. The liquid crystal display apparatus manufacturing apparatus according to claim 1, wherein the movement device aligns the first and second substrates with each other by moving the second substrate in a horizontal direction while fixing the first holding device.

3. The liquid crystal display apparatus manufacturing apparatus according to claim 1, wherein the resistance between the first and second substrates includes a resistance due to a viscosity and an elasticity of the sealing agent and further a frictional resistance between the first and second substrates.

* * * * *